(12) United States Patent
Waddell et al.

(10) Patent No.: US 7,906,600 B2
(45) Date of Patent: Mar. 15, 2011

(54) PROCESSABLE FILLED, CURABLE HALOGENATED ISOOLEFIN ELASTOMERS

(75) Inventors: Walter H. Waddell, Pasadena, TX (US); Dirk F. Rouckhout, Linter (BE); James P. Stokes, Katy, TX (US); Arthur J. Sullivan, Houston, TX (US); Donald S. Tracey, Kingwood, TX (US); Robert N. Webb, Kingwood, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 583 days.

(21) Appl. No.: 11/957,204

(22) Filed: Dec. 14, 2007

(65) Prior Publication Data

US 2008/0139730 A1 Jun. 12, 2008

Related U.S. Application Data

(63) Continuation-in-part of application No. 11/791,820, filed on May 29, 2007.

(60) Provisional application No. 60/639,939, filed on Dec. 29, 2004.

(51) Int. Cl.
*C08K 3/34* (2006.01)
*C08K 9/04* (2006.01)
*C08L 67/00* (2006.01)
*C08L 101/16* (2006.01)
*C08G 63/60* (2006.01)

(52) U.S. Cl. ........ 526/293; 526/347; 524/519; 524/551; 524/578

(58) Field of Classification Search .................. 526/293, 526/347; 524/519, 551, 578
See application file for complete search history.

(56) References Cited

U.S. PATENT DOCUMENTS

| 5,063,268 A | 11/1991 | Young et al. |
|---|---|---|
| 5,071,913 A | 12/1991 | Powers et al. |
| 5,162,445 A | 11/1992 | Powers et al. |
| 5,227,426 A | 7/1993 | Tse et al. |
| 5,333,662 A | 8/1994 | Costemalle et al. |
| 5,386,864 A | 2/1995 | Costemalle et al. |
| 5,391,625 A | 2/1995 | Arjunan et al. |
| 5,576,372 A | 11/1996 | Kresge et al. |
| 5,576,373 A | 11/1996 | Kresge et al. |
| 5,656,694 A | 8/1997 | Frechet et al. |
| 5,665,183 A | 9/1997 | Kresge et al. |
| 5,681,899 A | 10/1997 | Wang et al. |
| 5,807,629 A | 9/1998 | Elspass et al. |
| 5,883,173 A | 3/1999 | Elspass et al. |
| 5,936,023 A | 8/1999 | Kato et al. |
| 5,973,053 A | 10/1999 | Usuki et al. |
| 6,034,164 A | 3/2000 | Elspass et al. |
| 6,051,653 A | 4/2000 | McElrath et al. |
| 6,060,549 A | 5/2000 | Li et al. |
| 6,103,817 A | 8/2000 | Usuki et al. |
| 6,121,361 A | 9/2000 | Usuki et al. |
| 6,293,327 B1 | 9/2001 | Minagawa et al. |
| 6,624,220 B1 * | 9/2003 | Waddell et al. ............... 524/265 |
| 6,710,116 B1 | 3/2004 | Waddell et al. |
| 7,514,491 B2 * | 4/2009 | Weng et al. .................... 524/445 |
| 2002/0100530 A1 | 8/2002 | McElrath et al. |

FOREIGN PATENT DOCUMENTS

| EP | 0 922 732 | 6/1999 |
|---|---|---|
| EP | 1 331 107 | 7/2003 |
| WO | WO 92/02582 | 2/1992 |
| WO | WO 92/03302 | 3/1992 |
| WO | WO 94/22680 | 10/1994 |
| WO | WO 01/85831 | 11/2001 |
| WO | WO 03/170438 | 12/2001 |
| WO | WO 03/192854 | 12/2001 |
| WO | WO 02/31048 | 4/2002 |
| WO | WO 02/059194 | 8/2002 |
| WO | WO 02/100935 | 12/2002 |
| WO | WO 02/100936 | 12/2002 |
| WO | WO 02100935 A1 * | 12/2002 |
| WO | WO 2004/058825 | 7/2004 |
| WO | WO 2004/058874 | 7/2004 |
| WO | WO 2006/002033 | 1/2006 |
| WO | WO 2006/071959 | 7/2006 |

OTHER PUBLICATIONS

ExxonMobil Material Safety Data Sheet #3951 (Dec. 21, 2004).*
Y. Yurekli et al., "Structure and Dynamics of Carbon Black-Filled Elastomers," *J. Polym. Sci., Polym. Phys. Ed.*, vol. 39, p. 256 (2001); and M. F. Tse et al., "Structure and Dynamics of Carbon Black Filled Elastomers II, IMS and IR," *Rubber World*, vol. 228, No. 1, p. 30 (2003).
W. Barbin et al., Chapter 9 in *Science and Technology of Rubber*, J. E. Mark et al. Eds., 2nd Ed., Academic Press: New York, (1994).
M. F. Tse, "Green Tack of Butyl Polymers", *Polym. Prepr.*, vol. 45, No. 1, p. 980 (2004); (see Strobl, *The Physics of Polymers*, 2nd Ed, Springer, Germany (1997).
W. Tobolsky, *Properties and Structure of Polymers*, John Wiley & Sons, Inc., New York, NY, p. 219 (1960).

* cited by examiner

*Primary Examiner* — Kelechi C Egwim

(57) ABSTRACT

The present invention provides an elastomeric composition processable in a curable, filled rubber formulation. The composition comprises a halogenated interpolymer of a $C_4$ to $C_7$ isoolefin and from 3 to 20 weight percent alkylstyrene and comprising from 0.2 to 2 mole percent haloalkylstyrene, a Mooney viscosity less than 27, a number average molecular weight less than 270,000, a weight average molecular weight less than 470,000, a z-average molecular weight less than 700,000, and a branching index (g') from 0.4 to 1.1. Also disclosed are a method of making a cured, filled rubber article, comprising compounding the elastomeric composition with filler and curative, processing the compounded composition to form a shape of the article, and curing the composition to obtain the article in the formed shape, as well as a tire comprising an innerliner made by the method.

18 Claims, No Drawings

PROCESSABLE FILLED, CURABLE HALOGENATED ISOOLEFIN ELASTOMERS

CROSS REFERENCE TO RELATED APPLICATION

This application is a continuation in part of U.S. Ser. No. 11/791,820, filed May. 29, 2007, which claimed the benefit of U.S. Ser. No. 60/639,939, filed Dec. 29, 2004.

FIELD OF THE INVENTION

This invention relates to elastomers having improved green compound processability, and more particularly to filled elastomer compositions having utility as a tire innerliner wherein the uncured composition has a fast stress relaxation when strained to a prescribed deformation.

BACKGROUND OF THE INVENTION

Halobutyl rubbers, which are halogenated isobutylene/isoprene copolymers, are the polymers of choice for best air retention in tires for passenger, truck, bus and aircraft vehicles. Bromobutyl rubber, chlorobutyl rubber and halogenated star-branched butyl rubbers can be formulated for specific tire applications, such as tubes or innerliners. The selection of ingredients and additives for the final commercial formulation depends upon the balance of properties desired, namely, processability and tack of the green (uncured) compound in the tire plant versus the in-service performance of the cured tire composite. Examples of these elastomers are butyl (isobutylene-isoprene rubber or IIR), bromobutyl (brominated isobutylene-isoprene rubber or BIIR), chlorobutyl (chlorinated isobutylene-isoprene rubber or CIIR), star-branched butyl (SBB), EXXPRO™ elastomers (brominated isobutylene-co-p-methyl-styrene copolymer or BIMSM), etc. The present application focuses on processability of halogenated isoolefin polymers, including BIMSM.

It is known to form conventional and nanocomposite tire innerliners using brominated copolymers of isobutylene and para-methylstyrene, and blends of these copolymers with other polymers. See, for example, Elspass et al., U.S. Pat. Nos. 5,807,629, and 6,034,164. Conventional tire innerliners are typically filled with carbon black or another filler, whereas nanocomposites typically can also include clay.

Carbon black is a conventional reinforcing material used in halogenated isoolefin rubbers. The major carbon black used in tire innerliners is N660, which has a nitrogen surface area of 35 $m^2/g$. W. Barbin et al., Chapter 9 in *Science and Technology of Rubber*, J. E. Mark et al. Eds., 2nd Ed., Academic Press: New York, (1994). N234 is another common carbon black, which has a nitrogen surface area of 126 $m^2/g$ and greater reinforcing characteristics. The tack behavior of butyl polymer containing a small amount of tackifier is known from, for example, M. F. Tse, "Green Tack of Butyl Polymers", *Polym. Prepr.*, vol. 45, no. 1, p. 980 (2004).

Nanocomposites are polymer systems containing inorganic particles with at least one dimension in the nanometer range. Some examples of these are disclosed in U.S. Pat. Nos. 6,060,549, 6,103,817, 6,034,164, 5,973,053, 5,936,023, 5,883,173, 5,807,629, 5,665,183, 5,576,373, and 5,576,372. Common types of inorganic particles used in nanocomposites are phyllosilicates, an inorganic substance from the general class of so called "nano-clays" or "clays." Due to the general enhancement in air barrier qualities of various polymer blends when clays are present, there is a desire for a nanocomposite with low air permeability; especially a dynamically vulcanized elastomer nanocomposite such as used in the manufacture of tires.

Organoclays are typically produced through solution based ion-exchange reactions that replace sodium ions that exist on the surface of sodium montmorillonite with organic molecules such as alkyl or aryl ammonium compounds and typically known in the industry as swelling or exfoliating agents. See, e.g., U.S. Pat. No. 5,807,629, WO 02/100935, and WO 02/100936. Other background references include U.S. Pat. Nos. 5,576,373, 5,665,183, 5,807,629, 5,936,023, 6,121,361, WO 94/22680, WO 01/85831, and WO 04/058874. Elastomeric nanocomposite innerliners and innertubes have also been formed using a complexing agent and a rubber, where the agent is a reactive rubber having positively charged groups and a layered silicate uniformly dispersed therein. See, for example, Kresge et al. U.S. Pat. Nos. 5,665,183 and 5,576,373.

Regardless of the filler employed, brominated copolymers of isobutylene and para-methylstyrene, and blends thereof used in tire innerliners, would desirably have a processability similar to that of conventional bromobutyl rubber, especially when filled with various levels of carbon black, clay particles, or the like. When a polymer is deformed, a stress builds up in the polymer due to a decrease in entropy. However, even if the polymer is kept in the strained state, the stress will drop or relax because the polymer chains tend to diffuse back to the isotropic state of highest thermodynamic probability. Good processability requires fast stress relaxation of the green or uncured composition when strained to a prescribed deformation. Therefore, as used herein, the terminology of processability and stress relaxation is used synonymously. Poor processability or a slow stress decay or relaxation poses problems in tire building because no operator wants to handle a piece of rubber compound that continues to shrink as time goes on. Although this application has existed for many decades, there are not many systematic studies on the processability of green elastomers loaded with carbon black or other fillers. Usually, the concentration of carbon black ranges from 40-100 phr, where phr stands for parts per hundred of rubber (if elastomer=100 g, then carbon black=40-100 g). Of course, besides processability, it is desired to maintain other elastomer innerliner compound performance advantages as much as possible, such as impermeability, flex fatigue resistance, cured adhesion, etc.

At low carbon black loading in a butyl rubber, the composite can be described as showing a liquid-like behavior. With increasing carbon black loading in many butyl rubbers, a gel-like behavior can occur when the filler has a high enough concentration and/or the polymer has strong enough interactions with the filler so that the filler particles begin to percolate through the polymer to form a continuous network. The carbon black or other filler loading concentration at which gel-like or pseudo-solid-like behavior occurs is referred to as the percolation threshold.

Usually, lower critical filler concentrations or percolation thresholds are the result of stronger polymer/filler interactions, as described in Y. Yurekli et al., "Structure and Dynamics of Carbon Black-Filled Elastomers," *J. Polym. Sci., Polym. Phys. Ed.*, vol. 39, p. 256 (2001); and M. F. Tse et al., "Structure and Dynamics of Carbon Black Filled Elastomers II, IMS and IR," *Rubber World*, vol. 228, no. 1, p. 30 (2003). With increasing filler loadings, the percolation threshold can manifest itself in various ways, for example: a sharp increase in relaxation time; a sharp increase in the area under the stress relaxation curve, referred to as the steady state viscosity (see Strobl, *The Physics of Polymers*, 2nd Ed., Springer, Germany (1997) (a faster relaxation will result in a smaller area, hence, a lower steady state viscosity or an improvement in processability); an increase in storage modulus (G') in the low frequency region to a similar magnitude as the loss modulus (G"); etc. In any case, it is observed that processability declines significantly when the loading exceeds the percolation threshold. An explanation of stress relaxation of a polymer is given in W. Tobolsky, *Properties and Structure of Polymers*, John Wiley & Sons, Inc., New York, N.Y., p. 219 (1960).

The improvement of processability of rubber compounds based on star-branched butyl and halobutyl polymers is known, for example, from Powers et al., U.S. Pat. No. 5,071,913. Unique polymerization conditions enable broadening of the molecular weight distribution via a high degree of branching so that the polymer consists of low molecular weight linear chains that are blended with a small fraction of star-shaped molecules. Processability benefits include faster stress relaxation, enhanced green strength, and improved mixing, calendering and extrusion.

The present invention discloses halogenated isoolefin elastomers filled with carbon black or another filler, having a molecular weight and composition for fast large strain induced stress relaxation of the green rubber compounds, and improved small-strain viscoelastic properties, which determine at what concentration the filler begins to percolate and form a continuous network. It has quite surprisingly been found that, when filled with carbon black, clay or another filler, halogenated isoolefin elastomers, such as, for example, brominated isobutylene-para-methylstyrene elastomers having specified characteristics of alkylstyrene content, bromine content, Mooney viscosity, molecular weight, and branching index, have a similar degree of stress relaxation compared to conventional bromobutyl rubbers.

SUMMARY OF THE INVENTION

It has been found that for good processability in the filled, green compound, halogenated isoolefin elastomers should have specific Mooney viscosity, molecular weight, and branching index characteristics. The use of such an elastomer provides improved melt properties and processability characteristics of the filled composition, such as viscosity, relaxation characteristics, green strength, and other physical properties. Improvements in permeability can also be realized. Many physical properties of end use products formed with these elastomers can be comparable to those of nanocomposites or other filled compositions formed with conventional elastomers such as bromobutyl rubbers (brominated isobutylene-isoprene rubber or BIIR). For example, the composition of the invention can be used as an air barrier, such as in innerliners and innertubes.

In one embodiment, the present invention provides an elastomeric composition processable in a curable, filled rubber formulation. The composition includes a halogenated interpolymer of a $C_4$ to $C_7$ isoolefin and from 3 to 20 weight percent (wt %) alkylstyrene. The interpolymer comprises from 0.2 to 2 mole percent (mol %) haloalkylstyrene. The interpolymer has a Mooney viscosity less than 27, a number average molecular weight less than 270,000, a weight average molecular weight less than 470,000, a z-average molecular weight less than 700,000, and a branching index (g') from 0.4 to 1.1. In one embodiment, the isoolefin is isobutylene, the alkylstyrene is p-methylstyrene and the halogen is bromine.

In one embodiment, the Mooney viscosity of the interpolymer is between 15 and 26, the number average molecular weight is between 170,000 and 270,000, the weight average molecular weight is between 300,000 and 470,000, and/or the z-average molecular weight is between 400,000 and 700,000; and in another embodiment the Mooney viscosity is between 15 and 21, the number average molecular weight is between 170,000 and 240,000, the weight average molecular weight is between 300,000 and 440,000, and/or the z-average molecular weight is between 400,000 and 650,000.

The elastomeric composition can further include a secondary rubber, processing aid, curative, antidegradant, filler, softener, or the like, or a combination thereof. In one embodiment, the elastomeric composition includes from 20 to 70 phr carbon black, from 1 to 30 phr nano-filler in another embodiment, and a combination of from 20 to 70 phr carbon black and from 1 to 30 phr nano-filler in a further embodiment.

In another aspect, the present invention provides a method of making a cured, filled rubber article. The method includes: (a) compounding an elastomeric composition with filler and curative, wherein the elastomeric composition is described above; (b) processing the compounded composition to form a shape of the article; and (c) curing the composition to obtain the article in the formed shape. The article can be an innerliner or an innertube, for example.

In another embodiment, the invention provides a tire comprising an innerliner made by the method of: (a) compounding the elastomeric composition described above with filler and curative, e.g. wherein the elastomeric composition comprises a brominated interpolymer of isobutylene and from 3 to 20 weight percent p-methylstyrene and comprising from 0.2 to 2 mole percent bromomethylstyrene, a Mooney viscosity less than 27, a number average molecular weight less than 270,000, a weight average molecular weight less than 470,000, a z-average molecular weight less than 700,000, and a branching index (g') from 0.4 to 1.1; (b) processing the compounded composition to form an innerliner shape in a tire; and (c) curing the composition to form the innerliner in the tire.

DETAILED DESCRIPTION

The following language is of the best presently contemplated mode or modes of carrying out the invention. This description is made for the purpose of illustrating the general principles of the invention and should not be taken in a limiting sense. The scope of the invention is best determined by reference to the appended claims.

This invention describes an uncured, filled elastomer composition with processability, a process for making a useful article from the composition, and the useful articles so made. The composition or article in one embodiment is a nanocomposite of a halogenated elastomer and a clay also including carbon black as a reinforcing filler, suitable for use as an air barrier, e.g. as an innerliner or innertube.

Elastomer

The composition of the present invention includes an elastomer comprising $C_4$ to $C_7$ isoolefin derived units. The elastomer can be halogenated. The isoolefin may be a $C_4$ to $C_7$ compound, in one embodiment selected from isobutylene, isobutene, 2-methyl-1-butene, 3-methyl-1-butene, 2-methyl-2-butene, and 4-methyl-1-pentene. The elastomer may also include other monomer derived units. In one embodiment, the elastomer includes at least one styrenic monomer, which may be any substituted styrene monomer unit, and desirably is selected from styrene, α-methylstyrene or an alkylstyrene (ortho, meta, or para), the alkyl selected from any $C_1$ to $C_5$ alkyl or branched chain alkyl. In a desirable embodiment, the styrenic monomer is p-methylstyrene.

The elastomers in one embodiment of the invention are random elastomeric copolymers of a $C_4$ to $C_7$ isoolefin, such as isobutylene and a para-alkylstyrene comonomer, preferably para-methylstyrene containing at least 80%, more preferably at least 90% by weight of the para-isomer and can also include functionalized interpolymers wherein at least some of the alkyl substituent groups present in the styrene monomer units contain benzylic halogen or some other functional group. In another embodiment of the invention, the interpolymer is a random elastomeric copolymer of ethylene or a $C_3$ to $C_6$ α-olefin and a para-alkylstyrene comonomer, preferably para-methylstyrene containing at least 80%, more preferably at least 90% by weight of the para-isomer and also include functionalized interpolymers wherein at least some of the alkyl substituents groups present in the styrene monomer units contain benzylic halogen or some other functional group. Preferred materials may be characterized as interpolymers containing the following monomer units randomly spaced along the polymer chain:

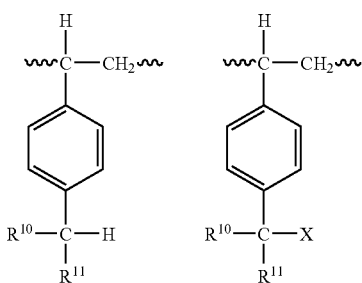

wherein $R^{10}$ and $R^{11}$ are independently hydrogen, lower alkyl, preferably $C_1$ to $C_7$ alkyl, and primary or secondary alkyl halides and X is a functional group such as halogen. Preferably $R^{10}$ and $R^{11}$ are hydrogen. Up to 60 mole percent of the para-substituted styrene present in the interpolymer structure may be a functionalized structure in one embodiment, and in another embodiment from 0.1 to 5 mole percent. In yet another embodiment, the amount of functionalized structure is from 0.4 to 1 mole percent.

The functional group X may be halogen or a combination of a halogen and some other functional group such which may be incorporated by nucleophilic substitution of benzylic halogen with other groups such as carboxylic acids; carboxy salts; carboxy esters, amides and imides; hydroxy; alkoxide; phenoxide; thiolate; thioether; xanthate; cyanide; nitrile; amino and mixtures thereof. These functionalized isoolefin copolymers, their method of preparation, methods of functionalization, and cure are more particularly disclosed in U.S. Pat. No. 5,162,445, and in particular, the functionalized amines as described below.

Most useful of such functionalized materials are elastomeric random interpolymers of isobutylene and para-methylstyrene containing from 0.5 to 20 or 30 weight percent para-methylstyrene, wherein up to 60 mole percent of the methyl substituent groups present on the benzyl ring contain a bromine or chlorine atom, preferably a bromine atom (para (bromomethylstyrene)), as well as a combination of para (bromomethylstyrene) and other functional groups such as ester and ether. These halogenated elastomers are commercially available as EXXPRO™ Elastomers (ExxonMobil Chemical Company, Houston Tex.), and abbreviated as "BIMSM." These elastomers can, if desired, have a substantially homogeneous compositional distribution such that at least 95% by weight of the polymer has a para-alkylstyrene content within 10% of the average para-alkylstyrene content of the polymer.

Preferred polymers are brominated polymers that generally contain from 0.1 to 5 mole percent of bromomethylstyrene groups relative to the total amount of monomer derived units in the polymer. In another embodiment, the amount of bromomethyl groups is from 0.2 to 3.0 mole percent, and from 0.3 to 2.8 mole percent in yet another embodiment, and from 0.4 to 2.5 mole percent in yet another embodiment, and from 0.3 to 2.0 in yet another embodiment, wherein a desirable range may be any combination of any upper limit with any lower limit. Expressed another way, preferred copolymers contain from 0.2 to 10 weight percent of bromine, based on the weight of the polymer, from 0.4 to 6 weight percent bromine in another embodiment, and from 0.6 to 5.6 weight percent in another embodiment, are substantially free of ring halogen or halogen in the polymer backbone chain. In one embodiment of the invention, the interpolymer is a copolymer of $C_4$ to $C_7$ isoolefin derived units (or isomonoolefin), para-methylstyrene derived units and para-(halomethylstyrene) derived units, wherein the para-(halomethylstyrene) units are present in the interpolymer from 0.4 to 3.0 mole percent based on the total number of para-methylstyrene, and wherein the para-methylstyrene derived units are present from 3 weight percent to 15 weight percent based on the total weight of the polymer in one embodiment, and from 4 weight percent to 10 weight percent in another embodiment. In another embodiment, the para-(halomethylstyrene) is para-(bromomethylstyrene).

In accordance with the invention, the elastomer has a Mooney viscosity less than 27, and between 15 and 26, between 15 and 21, between 15 and 18 in other embodiments. Desirable interpolymers can also be characterized by a narrow molecular weight distribution ($M_w/M_n$) of less than 5, more preferably less than 2.5.

The interpolymers can also be characterized by a preferred viscosity average molecular weight in the range of from 2,000 up to 2,000,000 and a preferred number average molecular weight in the range of from 2500 to 750,000 as determined by gel permeation chromatography. In particular embodiments it may be preferable to utilize two or more interpolymers having a similar backbone, such as a low molecular weight interpolymer having a weight average molecular weight less than 150,000 can be blended with a high molecular weight interpolymer having a weight average molecular weight greater than 250,000, for example.

The polymers may be prepared by a slurry polymerization of the monomer mixture using a Lewis acid catalyst, followed by halogenation, preferably bromination, in solution in the presence of halogen and a radical initiator such as heat and/or light and/or a chemical initiator and, optionally, followed by electrophilic substitution of bromine with a different functional moiety.

Fillers and Other Additives

The composition of the invention may also include one or more filler components such as calcium carbonate, clay, mica, silica and silicates, talc, titanium dioxide, and carbon black. As used herein, fillers can include inorganic clay and/or organoclay particles forming part of the nanocomposite matrix, e.g. clay particles having a dimension in the nanometer range, as well as larger clay particles that can be used as a filler by itself or with smaller clay particles in the nanocomposites, if desired. In one embodiment, the filler is carbon black or modified carbon black. The filler is semi-reinforcing grade carbon black present at a level of from 10 to 150 phr of the blend, more preferably from 30 to 120 phr, and especially from 35 to 100 phr. Useful grades of carbon black as described in RUBBER TECHNOLOGY 59-85 (1995) range from N110 to N990. More desirably, embodiments of the carbon black useful in, for example, tire treads are N229, N351, N339, N220, N234 and N110 provided in ASTM (D3037, D1510, and D3765). Embodiments of the carbon black useful in, for example, sidewalls in tires are N330, N351, N550, N650, N660, and N762. Embodiments of the carbon black useful in, for example, innerliners for tires are N550, N650, N660, N762, and N990.

The nanocomposites of the present invention can include swellable inorganic clay. Swellable layered inorganic clay materials suitable for the purposes of this invention include natural or synthetic phyllosilicates, particularly smectic clays such as montmorillonite, nontronite, beidellite, volkonskoite, laponite, hectorite, saponite, sauconite, magadite, kenyaite, stevensite and the like, as well as vermiculite, halloysite, aluminate oxides, hydrotalcite and the like. These layered clays generally comprise particles containing a plurality of silicate platelets having a thickness of 8-12 Å tightly bound together at interlayer spacings of 4 Å or less, and contain exchangeable cations such as $Na^+$, $Ca^{+2}$, $K^+$ or $Mg^{+2}$ present at the interlayer surfaces.

The layered clay can be exfoliated by suspending the clay in a water solution. Preferably, the concentration of clay in water is sufficiently low to minimize the interaction between clay particles and to fully exfoliate the clay. In one embodiment, the aqueous slurry of clay can have a clay concentration of between 0.1 and 5.0 weight percent; between 0.1 and 3.0 weight percent in other embodiments.

In certain embodiments, an aqueous slurry of clay can be prepared by stirring clay and water at room temperature for a time sufficient to exfoliate the clay. In one embodiment, the clay and water can be stirred for between 0.25 and 24 hours. The clay and water can be stirred for between 4 and 16 hours, or between 10 and 14 hours, in other embodiments.

In other embodiments, the clay can be mixed with an organic liquid to form a clay dispersion. The clay can be an inorganic clay or an organically modified clay; the organic liquid can be miscible or immiscible in water. In certain embodiments, the dispersion can have a clay concentration of between 0.1 and 5.0 weight percent; between 0.1 and 3.0 weight percent in other embodiments.

The layered clay can also be intercalated and exfoliated by treatment with organic molecules (swelling or exfoliating "agents" or "additives") capable of undergoing ion exchange reactions with the cations present at the interlayer surfaces of the layered silicate. Suitable exfoliating additives include cationic surfactants such as ammonium ion, alkylamines or alkylammonium ion (primary, secondary, tertiary and quaternary), phosphonium or sulfonium derivatives of aliphatic, aromatic or arylaliphatic amines, phosphines and sulfides. Desirable amine compounds (or the corresponding ammonium ion) are those with the structure $R^{12}R^{13}R^{14}N$, wherein $R^{12}$, $R^{13}$, and $R^{14}$ are $C_1$ to $C_{30}$ alkyls or alkenes in one embodiment, $C_1$ to $C_{20}$ alkyls or alkenes in another embodiment, which may be the same or different. In one embodiment, the exfoliating agent is a so called long chain tertiary amine, wherein at least $R^{12}$ is a $C_{14}$ to $C_{20}$ alkyl or alkene.

The exfoliating agent can also be a diamine compound (or the corresponding ammonium or diammonium ion), such as diaminoalkane, N-alkyl-diaminoalkane, N,N-dialkyl-diaminoalkyl, N,N,N'-trialkyl-diaminoalkane, N,N,N',N'-tetraalkyl-diaminoalkane, or the like. Desirable diamines can have the structure $R^{18}R^{19}N$—$R^{20}$—$NR^{21}R^{22}$, wherein $R^{18}$, $R^{19}$, $R^{20}$, $R^{21}$, and $R^{22}$ are the same or different $C_1$ to $C_{30}$ alkyls or alkenes, or $C_1$ to $C_{20}$ alkyls or alkenes. When a long chain diamine is desired, at least one of the N-alkyl or N-alkene groups has from 8 to 30 carbon atoms, preferably from 14 to 20 carbon atoms. Specific non-limiting, illustrative examples include N-coco-1,3-diaminopropane, N-oleyl-1,3-diaminopropane, N-tallow-1,3-diaminopropane, N,N,N'-trimethyl-N'-tallow-1,3-diaminopropane, and so on.

Another class of exfoliating additives includes those which can be covalently bonded to the interlayer surfaces. These include polysilanes of the structure —$Si(R^{15})_2R^{16}$ where $R^{15}$ is the same or different at each occurrence and is selected from alkyl, alkoxy or oxysilane and $R^{16}$ is an organic radical compatible with the matrix polymer of the composite.

Other suitable exfoliating additives include protonated amino acids and salts thereof containing 2-30 carbon atoms such as 12-aminododecanoic acid, epsilon-caprolactam and like materials. Suitable swelling agents and processes for intercalating layered silicates are disclosed in U.S. Pat. Nos. 4,472,538, 4,810,734, and 4,889,885 as well as WO92/02582.

In a preferred embodiment of the invention, the exfoliating additive or additives are capable of reaction with the halogen sites on the interpolymer to form complexes which help exfoliate the clay. In one embodiment, the additive includes all primary, secondary and tertiary amines and phosphines; alkyl and aryl sulfides and thiols; and their polyfunctional versions. Desirable additives include: long-chain tertiary amines such as N,N-dimethyl-octadecylamine, N,N-dioctadecyl-methylamine, so called dihydrogenated tallowalkyl-methylamine and the like, and amine-terminated polytetrahydrofuran; long-chain thiol and thiosulfate compounds like hexamethylene sodium thiosulfate.

The exfoliating additive such as described herein is present in the composition in an amount to achieve optimal air retention as measured by the permeability testing described herein. For example, the additive may be present from 0.1 to 20 phr in one embodiment, and from 0.2 to 15 phr in yet another embodiment, and from 0.3 to 10 phr in yet another embodiment. The exfoliating additive may be added to the composition at any stage; for example, the additive may be added to the interpolymer, followed by addition of the clay, or may be added to the interpolymer and clay mixture; or the additive may be first blended with the clay, followed by blending with the interpolymer in yet another embodiment.

Other possible fillers to be added to the elastomer include nano-sized talcs. Such talcs have a very high surface area in comparison to conventional sized talc platelets. The nano-sized talcs have a maximum dimension in the 100 to 200 nm range.

In another embodiment of the invention, improved interpolymer impermeability is achieved by the presence of at least one polyfunctional curative. An embodiment of such polyfunctional curatives can be described by the formula Z—$R^{17}$—Z', wherein $R^{17}$ is one of a $C_1$ to $C_{15}$ alkyl, $C_2$ to $C_{15}$ alkenyl, and $C_6$ to $C_{12}$ cyclic aromatic moiety, substituted or unsubstituted; and Z and Z' are the same or different and are one of a thiosulfate group, mercapto group, aldehyde group, carboxylic acid group, peroxide group, alkenyl group, or other similar group that is capable of crosslinking, either intermolecularly or intramolecularly, one or more strands of a polymer having reactive groups such as unsaturation. So-called bis-thiosulfate compounds are an example of a desirable class of polyfunctional compounds included in the above formula. Non-limiting examples of such polyfunctional curatives are as hexamethylene bis(sodium thiosulfate) and hexamethylene bis(cinnamaldehyde), and others are well known in the rubber compounding arts. These and other suitable agents are disclosed in, for example, the BLUE BOOK, MATERIALS, COMPOUNDING INGREDIENTS, MACHINERY AND SERVICES FOR RUBBER (D. R. Smith, ed., Lippincott & Petto Inc. 2001). The polyfunctional curative, if present, may be present in the composition from 0.1 to 8 phr in one embodiment, and from 0.2 to 5 phr in yet another embodiment.

Treatment with the swelling agents described above results in intercalation or "exfoliation" of the layered platelets as a consequence of a reduction of the ionic forces holding the layers together and introduction of molecules between layers which serve to space the layers at distances of greater than 4 Å, preferably greater than 9 Å. This separation allows the layered silicate to more readily sorb polymerizable monomer material and polymeric material between the layers and facilitates further delamination of the layers when the intercalate is shear mixed with matrix polymer material to provide a uniform dispersion of the exfoliated layers within the polymer matrix.

The amount of clay or exfoliated clay incorporated in the nanocomposites in accordance with this invention is sufficient to develop an improvement in the mechanical properties or barrier properties of the nanocomposite, for example, tensile strength or oxygen permeability. Amounts of clay in the nanocomposite generally will range from 0.5 to 10 weight percent in one embodiment, from 1 to 8 weight percent in another embodiment, and from 1 to 5 weight percent in another embodiment, based on the polymer content of the nanocomposite. Expressed in parts per hundred rubber, the clay or exfoliated clay may be present from 1 to 30 phr in one embodiment, and from 5 to 20 phr in another embodiment.

The addition of fillers such as calcium carbonate, clay, mica, silica and silicates, talc, titanium dioxide, and carbon black raises the Mooney viscosity of the elastomer from the starting value of less than 27 to a level comparable to the Mooney viscosity of commercial elastomers often used in manufacturing air impermeable rubber compounds. The Mooney viscosity of several commercial elastomers are listed below:

Blending of the fillers, additives, and/or curative components may be carried out by combining the desired components and the nanocomposite of the present invention in any suitable mixing device such as a Banbury™ mixer, Brabender™ mixer or preferably a mixer/extruder and mixing at temperatures in the range of 120° C. up to 300° C. under conditions of shear sufficient to allow the components to become uniformly dispersed within the polymer to form the nanocomposite.

Nanocomposite Processing

Elastomer—clay nanocomposites can be formed using a variety of processes, such as solution blending, melt blending, or an emulsion process. For example, in commonly assigned US Patent Application Publication 2007/015853, published Jan. 18, 2007 for Functionalized Isobutylene Polymer-Inorganic Clay Nanocomposites and Organic-Aqueous Emulsion Process there is disclosed a method for preparing clay-butyl rubber nanocomposites from an emulsion of rubber solution and aqueous clay dispersion in which the clay can be an inorganic clay. As another example of nanocomposite processing, in commonly assigned U.S. application Ser. No. 11/183,361 for Split-Stream Process for Making Nanocomposites by W. Weng et al., filed Jul. 18, 2005, there is disclosed a method for preparing clay-butyl rubber nanocomposites by preparing a concentrated nanocomposite from a slipstream of the rubber and blending the concentrate with a main rubber stream.

Characterization of Elastomers

| Elastomer - Commercial Designation | Mooney Viscosity [ML (1 + 8) 125° C.] | Mn kg/mol | Mw kg/mol | Mz kg/mol | g' [Dimensionless] | BrPMS Mol % | PMS Wt % |
|---|---|---|---|---|---|---|---|
| BIIR 2222* | 32 | 240 | 660 | 1590 | 0.86 | 2.0** | 0 |
| EXXPRO 01-5# | 44 | 300 | 500 | 740 | 0.93 | 0.85 | 10 |
| EXXPRO 89-1# | 37 | 240 | 400 | 610 | 0.97 | 0.75 | 5 |
| EXXPRO 90-10# | 45 | 280 | 490 | 720 | 0.96 | 1.2 | 7.5 |

*bromobutyl rubber; ExxonMobil Chemical Company (Houston, Tx)
**wt % bromine
Brominated poly(isobutylene-co-p-methylstyrene); ExxonMobil Chemical Company (Houston, Tx)

The composition of this invention may optionally include curative systems which are capable of curing the functionalized elastomeric copolymer component of the blend to provide vulcanizable compositions. Suitable curative systems for the elastomeric copolymer component of the present invention include organic peroxides, zinc oxide in combination with zinc stearate or stearic acid and, optionally, one or more of the following accelerators or vulcanizing agents: Permalux (di-ortho-tolylguanidine salt of dicatechol borate), HVA-2 (m-phenylene bis maleimide), Zisnet (2,4,6-trimercapto-5 triazine), ZDEDC (zinc diethyl dithiocarbamate) and other dithiocarbamates, Tetrone A (dipenta-methylene thiuram hexasulfide), Vultac-5 (alkylated phenol disulfide), SP1045 (phenol formaldehyde resin), SP1056 (brominated alkyl phenol formaldehyde resin), DPPD. (diphenyl phenylene diamine), salicyclic acid (o-hydroxy benzoic acid), wood rosin (abietic acid), and TMTDS (tetramethyl thiuram disulfide) in combination with sulfur. The composition may also be cured using ultraviolet light or electron irradiation.

The compositions of the invention may also contain other conventional additives such as dyes, pigments, antioxidants, heat and light stabilizers, plasticizers, oils and other ingredients as known in the art.

Melt Blending

Nanocomposite comprising the above disclosed elastomer and nano-clays can be formed by a polymer melt blending process, such as that described in WO 2006/085957, published Aug. 17, 2006 for Polymeric Nanocomposites and Processes for Making the Same by W. Weng et al. for example. Blending of the components can be carried out by combining the polymer components and the clay in the form of an intercalate in any suitable mixing device such as a Banbury™ mixer, Brabender™ mixer or preferably a mixer/extruder and mixing at temperatures in the range of 120° C. up to 300° C. under conditions of shear sufficient to allow the clay intercalate to exfoliate and become uniformly dispersed within the polymer to form the nanocomposite.

Emulsion Processes

The nanocomposite of the present invention can also be formed by an emulsion processes. In one embodiment, the emulsion process can comprise mixing an aqueous slurry of inorganic clay with a polymer solution (cement). The mixing should be sufficiently vigorous to form emulsions or microemulsions. In some embodiments, the emulsions can be formed as an aqueous solution or suspension in an organic solution. Standard methods and equipment for both lab and large-scale production, including batch and continuous processes may be used to produce the polymeric nanocomposites of the invention.

In certain embodiments, a nanocomposite is produced by a process comprising contacting Solution A comprising water and at least one layered clay with Solution B comprising a solvent and at least one elastomer; and removing the solvent and water from the contact product of Solution A and Solution B to recover a nanocomposite. In certain embodiments, the emulsion is formed by subjecting the mixture to agitation using a high-shear mixer.

In some embodiments, a nanocomposite is produced by a process comprising contacting Solution A comprising water and at least one layered clay with Solution B comprising a solvent and at least one elastomer, wherein the contacting is performed in the presence of an emulsifier or surfactant.

The emulsions of the present invention are formed by conventional emulsion technology, that is, subjecting a mixture of the hydrocarbon, water and surfactant, when used, to sufficient shearing, as in a commercial blender or its equivalent for a period of time sufficient for forming the emulsion, e.g., generally at least a few seconds. For general emulsion information, see generally, "Colloidal Systems and Interfaces", S. Ross and I. D. Morrison, J. W. Wiley, NY, 1988. The emulsion can be allowed to remain in emulsion form, with or without continuous or intermittent mixing or agitation, with or without heating or other temperature control, for a period sufficient to enhance exfoliation of the clay, from 0.1 to 100 hours or more in one embodiment, from 1 to 50 hours in another embodiment, and from 2 to 20 hours in another embodiment.

When used, the surfactant concentration is sufficient to allow the formation of a relatively stable emulsion. Preferably, the amount of surfactant employed is at least 0.001 weight percent of the total emulsion, more preferably about 0.001 to about 3 weight percent, and most preferably 0.01 to less than 2 weight percent.

Cationic surfactants useful in preparing the emulsions of this invention include tertiary amines, diamines, polyamines, amine salts, as well as quaternary ammonium compounds. Non-ionic surfactants useful in preparing the emulsions of this invention include alkyl ethoxylates, linear alcohol ethoxylates, alkyl glucosides, amide ethoxylates, amine ethoxylates (coco-, tallow-, and oleyl-amine ethoxylates for example), phenol ethoxylates, and nonyl phenol ethoxylates.

Solution Blending

The nanocomposite of the present invention can also be formed by solution blending. In certain embodiments, a nanocomposite is produced by a process comprising contacting Solution A comprising a solvent comprising a hydrocarbon and at least one layered filler or clay with Solution B comprising a solvent and at least one elastomer, and removing the solvents from the contact product of Solution A and Solution B to form a nanocomposite.

In the previous embodiments, the layered filler may be a layered clay treated with organic molecules as described above. In yet another embodiment, a nanocomposite is produced by a process comprising contacting at least one elastomer and at least one layered filler in a solvent; and removing the solvent from the contact product to form a nanocomposite.

In another embodiment, a nanocomposite is produced by a process comprising contacting at least one elastomer and at least one layered filler in a solvent mixture comprising two solvents; and removing the solvent mixture from the contact product to form a nanocomposite.

In still another embodiment, a nanocomposite is produced by a process comprising contacting at least one elastomer and at least one layered filler in a solvent mixture comprising at least two or more solvents; and removing the solvent mixture from the contact product to form a nanocomposite.

In another embodiment, a nanocomposite is produced by a process to form a contact product comprising dissolving at least one elastomer and then dispersing at least one layered filler in a solvent or solvent mixture comprising at least two solvents; and removing the solvent mixture from the contact product to form a nanocomposite.

In yet another embodiment, a nanocomposite is produced by a process to form a contact product comprising dispersing at least one layered filler and then dissolving at least one elastomer in a solvent or solvent mixture comprising at least two solvents; and removing the solvent mixture from the contact product to form a nanocomposite.

In the embodiments described above, solvents may be present in the production of the nanocomposite composition from 30 to 99 weight percent, alternatively from 40 to 99 weight percent, alternatively from 50 to 99 weight percent, alternatively from 60 to 99 weight percent, alternatively from 70 to 99 weight percent, alternatively from 80 to 99 weight percent, alternatively from 90 to 99 weight percent, alternatively from 95 to 99 weight percent, based upon the total weight of the composition.

Additionally, in certain embodiments, when two or more solvents are prepared in the production of the nanocomposite composition, each solvent may comprise from 0.1 to 99.9 volume percent, alternatively from 1 to 99 volume percent, alternatively from 5 to 95 volume percent, and alternatively from 10 to 90 volume percent, with the total volume of all solvents present at 100 volume percent.

Nanocomposite Properties

In another embodiment, a nanocomposite formed from an above described process to improve the air impermeability of an elastomer has an oxygen transmission rate of 160 mm.cc/[$m^2$.day] at 40° C. or lower as measured on cured nanocomposite compositions or articles as described herein.

Alternatively, the oxygen transmission rate is 150 mm.cc/[$m^2$ day] at 40° C. or lower as measured on cured nanocomposite compounds as described herein; the oxygen transmission rate is 140 mm.cc/[$m^2$ day] at 40° C. or lower as measured on cured nanocomposite compounds as described herein; the oxygen transmission rate is 130 mm.cc/[$m^2$ day] at 40° C. or lower as measured on cured nanocomposite compounds as described herein; the oxygen transmission rate is 120 mm.cc/[m2.day] at 40° C. or lower as measured on cured nanocomposite compounds as described herein; the oxygen transmission rate is 110 mm.cc/[$m^2$ day] at 40° C. or lower as measured on cured nanocomposite compounds as described herein; the oxygen transmission rate is 100 mm.cc/[$m^2$ day] at 40° C. or lower as measured on cured nanocomposite compounds as described herein; the oxygen transmission rate is 90 mm.cc/[$m^2$ day] at 40° C. or lower as measured on cured nanocomposite compounds as described herein; the oxygen transmission rate is 80 mm.cc/[$m^2$.day] at 40° C. or lower as measured on cured nanocomposite compounds as described herein; or, the oxygen transmission rate is 70 mm.cc/[$m^2$ day] at 40° C. or lower as measured on cured nanocomposite compounds as described herein.

Secondary Rubber Component

A secondary rubber or "general purpose rubber" component may be blended with the disclosed compositions and end use articles of the present invention. These rubbers include, but are not limited to, natural rubbers, polyisoprene rubber, poly(styrene-co-butadiene) rubber (SBR), polybutadiene rubber (BR), poly(isoprene-co-butadiene) rubber (IBR), styrene-isoprene-butadiene rubber (SIBR), ethylene-propylene rubber (EPM), ethylene-propylene-diene rubber (EPDM), polysulfide, nitrile rubber, propylene oxide polymers, star-branched butyl rubber and halogenated star-branched butyl rubber, brominated butyl rubber, chlorinated butyl rubber, star-branched polyisobutylene rubber, star-branched brominated butyl (polyisobutylene/isoprene copolymer) rubber; other poly(isobutylene-co-p-methylstyrene) and halogenated poly(isobutylene-co-p-methylstyrene) elastomers, such as, for example, terpolymers of isobutylene derived units, p-methylstyrene derived units, and p-bromomethylstyrene derived units that have monomer contents, molecular weights, Mooney viscosities, chain branching indices or other properties not meeting the above BIMSM specifications, and mixtures thereof. Many of these rubbers are described by Subramaniam in RUBBER TECHNOLOGY 179-208 (M. Morton, Chapman & Hall 1995), THE VANDERBILT RUBBER HANDBOOK 105-122 (R. F. Ohm ed., R.T. Vanderbilt Co., Inc. 1990), or E. Kresge and H. C. Wang in 8 KIRK-OTHMER ENCYCLOPEDIA OF CHEMICAL TECHNOLOGY 934-955 (John Wiley & Sons, Inc. 4th ed. 1993).

A desirable embodiment of the secondary rubber component present is natural rubber. Desirable embodiments of the natural rubbers of the present invention are selected from Malaysian rubber such as SMR CV, SMR 5, SMR 10, SMR 20, and SMR 50 and mixtures thereof, wherein the natural rubbers have a Mooney viscosity at 100° C. (ML 1+4) of from 30 to 120, more preferably from 40 to 65. The Mooney viscosity test referred to herein is in accordance with ASTM D-1646.

Polybutadiene (BR) rubber is another desirable secondary rubber useful in the composition of the invention. The Mooney viscosity of the polybutadiene rubber as measured at 100° C. (ML 1+4) may range from 35 to 70, from 40 to about 65 in another embodiment, and from 45 to 60 in yet another embodiment. A desirable rubber is high cis-polybutadiene (cis-BR). By "cis-polybutadiene" or "high cis-polybutadiene", it is meant that 1,4-cis polybutadiene is used, wherein the amount of cis component is at least 95%. An example of a high cis-polybutadiene commercial product used in the composition is BUDENE™ 1207.

Rubbers of ethylene and propylene derived units such as EPM and EPDM are also suitable as secondary rubbers. Examples of suitable comonomers in making EPDM are ethylidene norbornene, 1,4-hexadiene, dicyclopentadiene, as well as others. A suitable ethylene-propylene rubber is commercially available as VISTALON™ (ExxonMobil Chemical Company, Houston Tex.).

In another embodiment, the secondary rubber is a halogenated rubber as part of the terpolymer composition. The halogenated butyl rubber is brominated butyl rubber, and in another embodiment is chlorinated butyl rubber.

The secondary rubber component of the present invention includes, but is not limited to at least one or more of brominated butyl rubber, chlorinated butyl rubber, star-branched polyisobutylene rubber, star-branched brominated butyl (polyisobutylene/isoprene copolymer) rubber; halogenated poly(isobutylene-co-p-methylstyrene), such as, for example, terpolymers of isobutylene derived units, p-methylstyrene derived units, and p-bromomethylstyrene derived units (BrIBMS), and the like halomethylated aromatic interpolymers as in U.S. Pat. Nos. 5,162,445, 4,074,035, and 4,395,506; halogenated isoprene and halogenated isobutylene copolymers, polychloroprene, and the like, and mixtures of any of the above. Some embodiments of the halogenated rubber component are also described in U.S. Pat. Nos. 4,703,091 and 4,632,963.

The halogenated elastomer useful as the secondary rubber in the present invention may also include a halogenated butyl rubber component. As used herein, "halogenated butyl rubber" refers to both butyl rubber and so-called "star-branched" butyl rubber, described below. In one embodiment of the invention, the halogenated rubber component is a halogenated copolymer of a $C_4$ to $C_7$ isoolefin and a multiolefin. In another embodiment, the halogenated rubber component is a blend of a polydiene or block copolymer, and a copolymer of a $C_4$ to $C_7$ isoolefin and a conjugated, or a "star-branched" butyl polymer. The halogenated butyl polymer useful in the present invention can thus be described as a halogenated elastomer comprising $C_4$ to $C_7$ isoolefin derived units, multiolefin derived units, and halogenated multiolefin derived units, and includes both "halogenated butyl rubber" and so called "halogenated star-branched" butyl rubber. In one embodiment, the halogenated butyl rubber is brominated butyl rubber, and in another embodiment is chlorinated butyl rubber.

The halogenated rubber component of the present invention includes, but is not limited to, brominated butyl rubber, chlorinated butyl rubber, star-branched polyisobutylene rubber, star-branched brominated butyl (polyisobutylene/isoprene copolymer) rubber; isobutylene-bromomethylstyrene copolymers such as isobutylene/meta-bromomethylstyrene, isobutylene/para-bromomethylstyrene, isobutylene/chloromethylstyrene, halogenated isobutylene cyclopentadiene, and isobutylene/para-chloromethylstyrene, and the like halomethylated aromatic interpolymers as in U.S. Pat. Nos. 4,074,035 and 4,395,506; isoprene and halogenated isobutylene copolymers, polychloroprene, and the like, and mixtures of any of the above. Some embodiments of the halogenated rubber component are also described in U.S. Pat. Nos. 4,703,091 and 4,632,963.

In another embodiment, the halogenated butyl or star-branched butyl rubber used as the secondary rubber component may be halogenated such that the halogenation is primarily allylic in nature. This is typically achieved by such means as free radical bromination or free radical chlorination, or by such methods as secondary treatment of electrophilically halogenated rubbers, such as by heating the rubber, to form the allylic halogenated butyl and star-branched butyl rubber. Common methods of forming the allylic halogenated polymer are disclosed by Gardner et al. in U.S. Pat. Nos. 4,632,963, 4,649,178, and 4,703,091. Thus, in one embodiment of the invention, the halogenated butyl rubber is such that the halogenated multiolefin units are primary allylic halogenated units, and wherein the primary allylic configuration is present to at least 20 mole percent (relative to the total amount of halogenated multiolefin) in one embodiment, and at least 30 mole percent in another embodiment. This arrangement can be described by the structure:

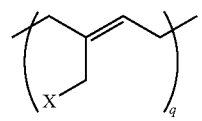

wherein X is a halogen, desirably chlorine or bromine, and q is at least 20 mole percent based on the total moles of halogen in one embodiment, and at least 30 mole percent in another embodiment, and from 25 mole percent to 90 mole percent in yet another embodiment.

A commercial embodiment of the halogenated butyl rubber used as the secondary rubber component of the present invention is Bromobutyl 2222 (ExxonMobil Chemical Company, Houston, Tex.). Its Mooney viscosity is from 27 to 37 (ML 1+8 at 125° C., ASTM 1646, modified), and the bromine content is from 1.8 to 2.2 weight percent relative to the Bromobutyl 2222. Further, cure characteristics of Bromobutyl 2222 are as follows: MH is from 28 to 40 dN·m, ML is from 7 to 18 dN·m (ASTM D2084, modified). Another commercial embodiment of the halogenated butyl rubber used as the secondary rubber component is Bromobutyl 2255 (ExxonMobil Chemical Company, Houston, Tex.). Its Mooney viscosity is from 41 to 51 (ML 1+8 at 125° C., ASTM 1646, modified), and the bromine content is from 1.8 to 2.2 weight percent. Further, cure characteristics of Bromobutyl 2255 are as follows: MH is from 34 to 48 dN·m, ML is from 11 to 21 dN·m (ASTM D2084, modified). The invention is not limited to the commercial source of any of the halogenated rubber components.

The composition of this invention may be extruded, compression molded, blow molded or injection molded into various shaped articles including fibers, films, industrial parts such as automotive parts, appliance housings, consumer products, packaging and the like. The resulting articles exhibit both high impact strength and low vapor permeability. In particular, the composition described herein is useful for air barriers such as bladders, air spring sleeves, and automotive (including truck, commercial and/or passenger) or aircraft innerliners and innertubes. Other useful goods that can be made using compositions of the invention include hoses, seals, belts, molded goods, cable housing, and other articles disclosed in THE VANDERBILT RUBBER HANDBOOK, p 637-772 (R. F. Ohm, ed., R.T. Vanderbilt Company, Inc. 1990).

Suitable elastomeric compositions for such articles as air barriers, and more particularly tire curing bladders, innerliners, tire innertubes, and air sleeves, including gaskets and ring structures, were prepared by using conventional mixing techniques such as with a Banbury™ mixer. The sequence of mixing and temperatures employed are well known to the skilled rubber compounder, the objective being the dispersion of fillers, activators and curatives in the polymer matrix without excessive heat buildup.

A useful mixing procedure utilizes the Banbury™ mixer with tangential rotors in which the elastomer and additional components, such as carbon black, clay, or plasticizer, are added and the composition mixed for the desired time or to a particular temperature to achieve adequate dispersion of the ingredients. Mixing is performed at temperatures in the range from the melting point of the elastomer and/or any secondary rubber used in the composition in one embodiment, from 40° C. up to 250° C. in another embodiment, and from 100° C. to 200° C. in yet another embodiment. If clay is added, the mixing should be under conditions of shear sufficient to allow the clay intercalate to exfoliate and become uniformly dispersed within the polymer to form a nanocomposite.

Typically, from 70% to 100% of the elastomer or elastomers is first mixed for 20 to 90 seconds, or until the temperature reaches from 40° C. to 75° C. Then, ¾ of any filler, and the remaining amount of elastomer, if any, are typically added to the mixer, and mixing continues until the temperature reaches from 90° C. to 150° C. Next, any remaining filler is added, as well as the processing aid, and mixing continues until the temperature reaches from 140° C. to 190° C. The masterbatch mixture is then finished by sheeting on an open mill and allowed to cool, for example, to from 60° C. to 100° C. when the curatives are added.

Mixing with clays in a Banbury™ mixer is performed by techniques known to those skilled in the art, wherein the clay may be added to the polymer at the same time as the carbon black in one embodiment. The processing aid is typically added later in the mixing cycle after the carbon black and clay have achieved adequate dispersion in the elastomeric matrix.

If the compounded rubber is to be used as an innerliner for a tire, innerliner stock is then prepared by calendering the compounded rubber into a sheet material having a thickness of roughly 1 to 2 mm (40 to 80 mil gauge) and cutting the sheet material into strips of appropriate width for innerliner applications. The sheet stock at this stage of the manufacturing process is a sticky, uncured mass and is therefore subject to deformation and tearing as a consequence of handling and cutting operations associated with tire construction.

The innerliner is then ready for use as an element in the construction of a pneumatic tire. A pneumatic tire is a layered laminate having an outer surface which includes the tread and sidewall elements, belt reinforcing layers radially inward of the tread, an intermediate carcass structure which comprises a number of plies containing tire reinforcing fibers, (e.g., rayon, polyester, nylon or metal fibers) embedded in a rubbery matrix with the ends thereof typically turned about a pair of non-extensible bead rings, and an innerliner which is laminated to the inner surface of the carcass structure. Tires are normally built on a tire building drum, in either a single or two stage building process. After the uncured green tire has been assembled, the uncured tire is placed in a heated mold having an inflatable bladder that expands into the interior of the tire and contacts the tire innerliner. The tire is then heated to vulcanization temperatures to cure the tire. Vulcanization temperatures generally range from about 100° C. to about 250° C., more preferably from 125° C. to 200° C., and times may range from about one minute to several hours, more preferably from about 5 to 30 minutes for passenger car tires. Vulcanization time and temperature is dependant on multiple factors, including tire size, thickness of the tire, and the elastomers used in the tire. Vulcanization of the assembled tire results in vulcanization of the elastomeric elements of the tire assembly and enhances the adhesion between these elements, resulting in a cured, unitary tire.

All priority documents are herein fully incorporated by reference for all jurisdictions in which such incorporation is permitted. Further, all documents cited herein, including testing procedures, are herein fully incorporated by reference for all jurisdictions in which such incorporation is permitted.

We claim:

1. An elastomeric composition processable in a curable, filled rubber formulation, comprising:
a halogenated interpolymer of a C4 to C7 isoolefin and from 3 to 20 weight percent alkylstyrene and comprising from 0.2 to 2 mole percent haloalkylstyrene, a Mooney viscosity less than 27, a number average molecular weight less than 270,000, a weight average molecular weight less than 470,000, a z average molecular weight less than 700,000, and a branching index (g') from 0.4 to 1.1.

2. The elastomeric composition of claim 1 wherein the isoolefin comprises isobutylene, the alkylstyrene comprises p-methylstyrene and the halogen comprises bromine.

3. The elastomeric composition of claim 2 wherein the Mooney viscosity is between 15 and 26, the number average molecular weight is between 170,000 and 270,000, the weight average molecular weight is between 300,000 and 470,000, and the z average molecular weight is between 400,000 and 700,000.

4. The elastomeric composition of claim 2 wherein the Mooney viscosity is between 15 and 21, the number average molecular weight is between 170,000 and 240,000, the weight average molecular weight is between 300,000 and 440,000, and the z average molecular weight is between 400,000 and 650,000.

5. The elastomeric composition of claim 1 having a characteristic steady state viscosity less than 2000 kPa-s.

6. The elastomeric composition of claim 1 further comprising secondary rubber, processing aid, curative, antidegradant filler, softener, or a combination thereof.

7. The elastomeric composition of claim 6, further comprising from 20 to 100 phr carbon black.

8. The elastomeric composition of claim 6 comprising from 1 to 30 phr clay.

9. A method of making a cured, filled rubber article, comprising:
compounding an elastomeric composition with filler and curative;
wherein the elastomeric composition comprises a brominated interpolymer of isobutylene and from 3 to 20 weight percent p-methylstyrene and comprising from 0.2 to 2 mole percent bromomethylstyrene, a Mooney viscosity less than 27, a number average molecular weight less than 270,000, a weight average molecular weight less than 470,000, a z average molecular weight less than 700,000, and a branching index (g') from 0.4 to 1.1;
processing the compounded composition to form a shape of the article; and
curing the composition to obtain the article in the formed shape.

10. The method of claim 9 wherein the Mooney viscosity of the interpolymer is between 15 and 26, the number average molecular weight is between 170,000 and 270,000, the weight average molecular weight is between 300,000 and 470,000, and the z average molecular weight is between 400,000 and 700,000.

11. The method of claim 9 wherein the Mooney viscosity of the interpolymer is between 15 and 21, the number average molecular weight is between 170,000 and 240,000, the weight average molecular weight is between 300,000 and 440,000, and the z average molecular weight is between 400,000 and 650,000.

12. The method of claim 9 wherein the compounded composition comprises a characteristic time for stress relaxation to 1 kPa less than 300 seconds and the processing comprises deforming the compounded composition and maintaining the deformation for a period of time to effect stress relaxation to less than 1 kPa.

13. The method of claim 9 wherein the compounded composition has a characteristic steady state viscosity less than 2000 kPa-s.

14. The method of claim 9 wherein the compounded composition further comprises secondary rubber, processing aid, antidegradant softener, or a combination thereof.

15. The method of claim 9 wherein the filler comprises from 20 to 100 phr carbon black.

16. The method of claim 9 wherein the filler comprises from 1 to 30 phr clay.

17. The method of claim 9 wherein the article comprises an innerliner or an innertube.

18. A tire comprising an innerliner made by the method of:
compounding an elastomeric composition with filler and curative;
wherein the elastomeric composition comprises a brominated interpolymer of isobutylene and from 3 to 20 weight percent p-methylstyrene and comprising from 0.2 to 2 mole percent bromomethylstyrene, a Mooney viscosity less than 27, a number average molecular weight less than 270,000, a weight average molecular weight less than 470,000, a z average molecular weight less than 700,000, and a branching index (g') from 0.4 to 1.1;
processing the compounded composition to form an innerliner shape in a tire; and
curing the composition to form the innerliner in the tire.

* * * * *